United States Patent
Muratani

(10) Patent No.: US 7,542,162 B2
(45) Date of Patent: Jun. 2, 2009

(54) IMAGE FORMING APPARATUS AND IMAGE FORMING METHOD

(75) Inventor: Masataka Muratani, Akishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1084 days.

(21) Appl. No.: 10/724,157

(22) Filed: Dec. 1, 2003

(65) Prior Publication Data
US 2005/0117174 A1    Jun. 2, 2005

(51) Int. Cl.
G06F 15/00    (2006.01)

(52) U.S. Cl. ............... 358/1.18; 358/1.13; 358/448

(58) Field of Classification Search ............ 358/1.13, 358/448, 488; 347/129, 249, 248; 399/388, 399/301, 101, 45; 355/319, 207, 14
See application file for complete search history.

(56) References Cited

U.S. PATENT DOCUMENTS

| | | | | |
|---|---|---|---|---|
| 4,585,332 A | * | 4/1986 | Shenoy | 399/86 |
| 4,864,365 A | * | 9/1989 | Ito | 399/28 |
| 4,935,786 A | * | 6/1990 | Veeder | 399/401 |
| 6,424,365 B1 | * | 7/2002 | Kimoto | 347/129 |
| 6,433,896 B1 | * | 8/2002 | Ueda et al. | 358/488 |
| 2002/0176725 A1 | * | 11/2002 | Sato et al. | 399/388 |
| 2003/0002891 A1 | * | 1/2003 | Metzler et al. | 399/301 |
| 2003/0161652 A1 | * | 8/2003 | Nishiwaki | 399/101 |
| 2003/0174200 A1 | * | 9/2003 | Izumiya et al. | 347/249 |

FOREIGN PATENT DOCUMENTS

| | | |
|---|---|---|
| JP | 4-288560 A | 10/1992 |
| JP | 2000-305324 A | 11/2000 |
| JP | 2002-258680 A | 9/2002 |
| JP | 2003-156974 A | 5/2003 |

\* cited by examiner

Primary Examiner—King Y Poon
Assistant Examiner—Allen H Nguyen
(74) Attorney, Agent, or Firm—Foley & Lardner LLP

(57) ABSTRACT

When an image is to be formed on a second surface of a paper sheet in a double-side printing operation, a main CPU corrects a main-scan magnification and a sub-scan magnification for printing on the second surface, by using correction data relating to the main-scan magnification and sub-scan magnification on the second surface, which is prestored in a RAM.

8 Claims, 5 Drawing Sheets

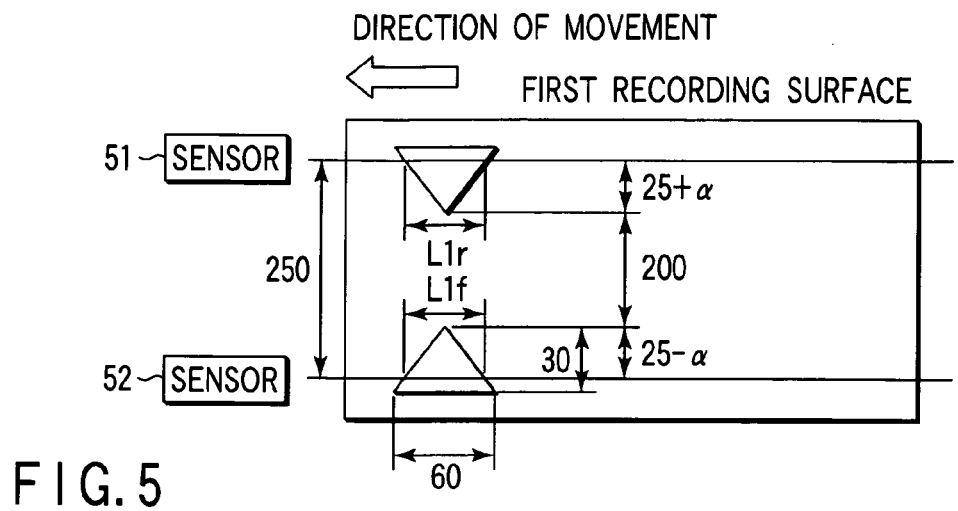
F I G. 5
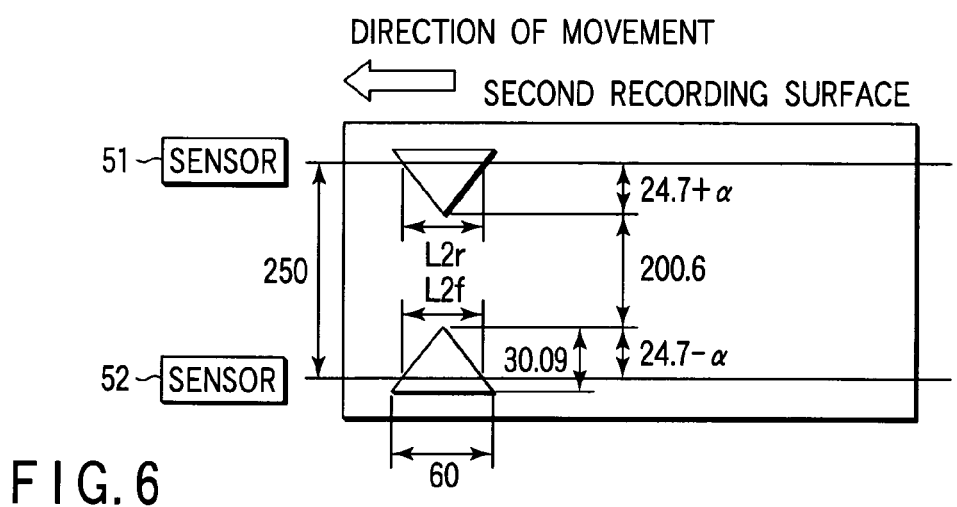
F I G. 6
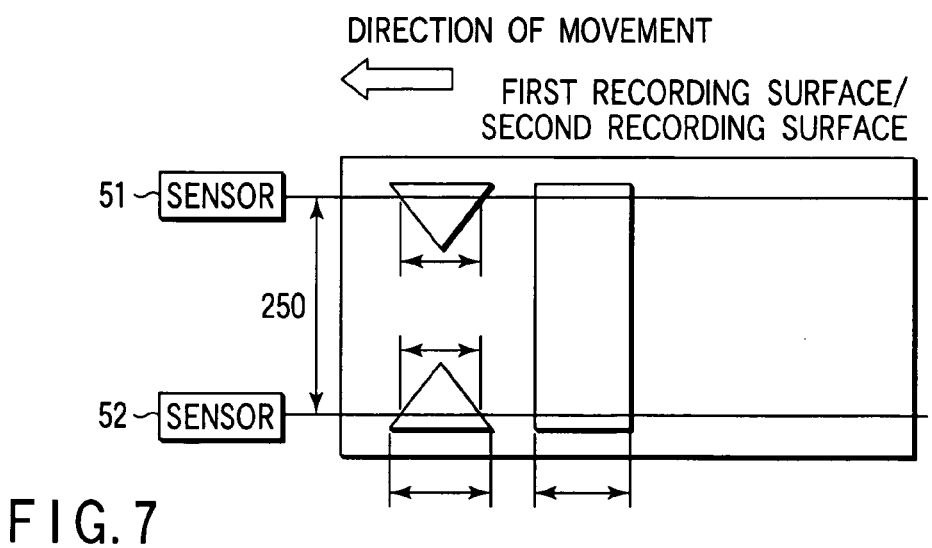
F I G. 7

IMAGE FORMING APPARATUS AND IMAGE FORMING METHOD

BACKGROUND OF THE INVENTION

The present invention relates to an image forming apparatus such as a digital copying machine, which has an automatic double-side unit and can effect printing on both sides of a paper sheet, and to an image forming method.

In a conventional digital copying machine, when a copying operation is executed, an original is fed to a reading mechanism and paper is fed to a printing/outputting mechanism. Thus, the copying is performed. In the case of double-side printing, a paper sheet, on one side of which printing has been effected, is reversed by a reversing section of an automatic double-side unit, and the paper sheet is fed once again.

In particular, in an automatic double-side unit with stackless configuration, the time difference between the first side recording of a paper sheet and the second side recording of the sheet has become shorter (e.g. within 10 seconds because of higher operation speed). In addition, with development in reduction of apparatus size, the distance of conveyance of the sheet between the completion of the first side recording and the start of the second side recording has become shorter. Consequently, since the time during which the sheet is set aside from the high-temperature section is short, it is difficult to sufficiently cool the sheet.

It is confirmed that when double-side printing (recording) is performed in the above-described circumstances, there occurs a difference in magnification of 0.2% to 0.4% between an image formed on an obverse side (first surface) of a sheet and an image formed on a reverse side (second surface) of the sheet (data on ordinary paper with a thickness of about 0.080 mm).

The situation below may be considered (numerical values are assumed ones).

Assume that the temperature of the paper sheet at the time of first surface recording is 30° C. and the width of the sheet is W (mm). When the first surface of the sheet is subjected to fixation by a fixing device, heat is sufficiently accumulated in the sheet at the fixing temperature (e.g. 160° C.). As a result, the sheet contracts.

Then, the sheet is reversed by the automatic double-side unit, and printing is effected on the second surface. At this time, the temperature of the sheet is 100° C., and the width of the sheet has not fully recovered from thermal contraction. The width is about 0.997W (mm).

Assume that a line segment of 280 mm is recorded on each of both surfaces of the sheet in the main-scan direction.

In the state in which the sheet is cooled and its sized has recovered to 100% from thermal contraction, the length of the recorded line segment on the first surface of the sheet is 280 mm and the length of the recorded line segment on the second surface is 280/0.997=280.84 mm.

In the prior art, it has been thought that there is no need to individually set magnifications in the main-scan direction and sub-scan direction with respect to the obverse surface and reverse surface of a paper sheet in the case of double-side printing (recording).

However, if numerical values as in the above-described example are indicated, there is such a problem that the main-scan magnification and sub-scan magnification need to be adjusted to proper values in the case of double-side printing in accordance with the structure and specifications of the apparatus, thereby to ensure a print position and dimensional precision.

BRIEF SUMMARY OF THE INVENTION

The object of an aspect of the present invention is to provide an image forming apparatus and an image forming method, which can adjust the main-scan magnification and sub-scan magnification to proper values in double-side printing, thereby to ensure a print position and dimensional precision.

According to an aspect of the present invention, there is provided an image forming apparatus having an automatic double-side unit and being capable of effecting printing on both surfaces of a paper sheet, comprising: setting means for setting an adjustment mode at a time of effecting printing on both surfaces of the paper sheet; first storage means for prestoring predetermined image data that is used in the adjustment mode set by the setting means; first control means for executing a control to form an image on a first surface of the sheet using the image data stored in the first storage means, when the setting means sets the adjustment mode; first measuring means for measuring a size of the image formed on the first surface of the sheet, when the image formed on the first surface of the sheet is subjected to thermal fixation and conveyed; second control means for executing a control to form an image on a second surface of the sheet using the image data stored in the first storage means, when the sheet is reversely fed by the automatic double-side unit; second measuring means for measuring a size of the image formed on the second surface of the sheet, when the image formed on the second surface of the sheet is subjected to thermal fixation and conveyed; calculation means for calculating correction data for a printing magnification for image formation on the second surface of the sheet, on the basis of a measurement result obtained by the first measuring means and a measurement result obtained by the second measuring means; and second storage means for storing the correction data calculated by the calculation means.

According to another aspect of the present invention, there is provided an image forming method for an image forming apparatus having an automatic double-side unit and being capable of effecting printing on both surfaces of a paper sheet, comprising: setting an adjustment mode at a time of effecting printing on both surfaces of the paper sheet; prestoring predetermined image data that is used in the adjustment mode; forming an image on a first surface of the sheet using the prestored image data, when the adjustment mode is set; measuring a size of the image formed on the first surface of the sheet, when the image formed on the first surface of the sheet is subjected to thermal fixation and conveyed; forming an image on a second surface of the sheet using the prestored image data, when the sheet is reversely fed by the automatic double-side unit; measuring a size of the image formed on the second surface of the sheet, when the image formed on the second surface of the sheet is subjected to thermal fixation and conveyed; calculating correction data for a printing magnification for image formation on the second surface of the sheet, on the basis of a measurement result relating to the first surface of the sheet and a measurement result relating to the second surface of the sheet; storing the calculated correction data; and executing, when an image is to be formed on the second surface of the sheet in double-side printing, a control to form the image by correcting a print magnification using the stored correction data.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of an aspect of the invention.

FIG. 5 shows an example in which predetermined images are printed on a first recording surface of a paper sheet in the main-scan direction and then the predetermined image on the sheet that is conveyed is sensed by sensors;

FIG. 6 shows a case where the second recording surface of the sheet contracts in the main-scan direction;

FIG. 7 shows a variation in magnification in the sub-scan direction;

DETAILED DESCRIPTION OF THE INVENTION

An embodiment of the present invention will now be described with reference to the accompanying drawings.

Figure 1:
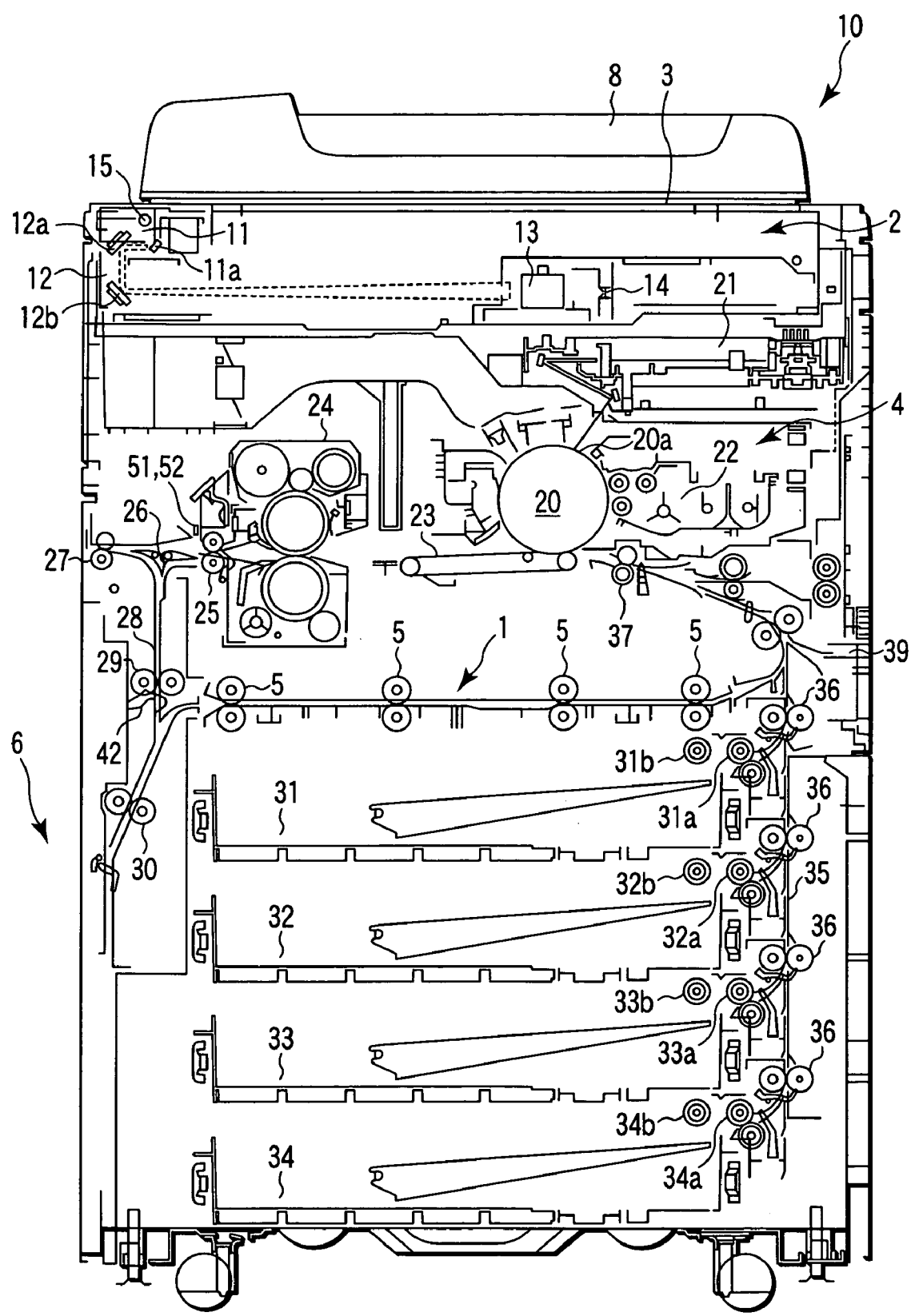
FIG. 1 is a cross-sectional view schematically showing the internal structure of a digital copying machine according to an image forming apparatus of the present invention.

FIG. 1 shows a schematic structure of a digital copying machine 10 including an automatic double-side unit 1 according to an embodiment of the invention. The automatic double-side unit (ADU) 1 receives a paper sheet, on one side of which an image is formed, from a printer section 4 (image forming section) (to be described later) in the digital copying machine 10. The automatic double-side unit 1 automatically reverses the sheet and feeds it to the printer section 4 once again.

As is shown in FIG. 1, the digital copying machine 10 includes a scanner section 2 that reads an image on an original and acquires image data; the aforementioned printer section 4 that forms on a paper sheet an image based on the image data acquired by the scanner section 2; the automatic double-side unit 1 that successively reverses paper sheets, on one side of each of which an image is formed by the printer section 4, and feeds them to the printer section 4 once again; and a sheet feed section 6 that feeds paper sheets of desired sizes to the printer section 4. In addition, an automatic document feeder (ADF) 8 is openably disposed on top of the digital copying machine 10.

The printer section 4 includes an exposing device 21 that emits a laser beam based on the image data acquired via a CCD sensor 14; a photosensitive drum 20 that is scanned and exposed with the laser beam emitted from the exposing device 21 so that an electrostatic latent image is formed on an outer peripheral surface 20a of the photosensitive drum 20, which is precharged with a predetermined potential; a developing device 22 that applies toner to, and thus develops, the electrostatic latent image formed on the outer peripheral surface 20a of the photosensitive drum 20; a transfer belt 23 that transfers the developed toner image onto a paper sheet fed from the sheet feed section 6 (to be described later) at a predetermined timing; and a fixing device 24 that fixes the toner image, which has been transferred on the paper sheet, on the paper sheet.

The electrostatic latent image formed on the outer peripheral surface 20a of the photosensitive drum 20 by the exposure/scan by the exposing device 21 is developed into a visible toner image by the toner supplied from the developing device 22. The visible toner image on the outer peripheral surface 20a is moved by the rotation of the photosensitive drum 20, and transferred onto the paper sheet fed from the sheet feed section 6 (to be described later). The paper sheet on which the toner image is transferred is passed through the fixing device 24. The toner image transferred on the sheet is heated and fused by the fixing device 24, and thus the toner image is fixed on the sheet.

Sensors 51 and 52 that sense images formed on the sheet by reflective light are provided on the downstream side of the fixing device 24, as will be described later.

The sheet, on one side of which an image is formed by the fixation of the toner image, is delivered to a direction-switching gate 26 via an image-fixed sheet output roller pair 25, which is provided on the downstream side of the fixing device 24. The direction-switching gate 26 is switched to output the sheet to the outside of the machine via an output roller pair 27, or feeds the sheet to the automatic double-side unit 1 via a reverse convey path 28, a reverse roller pair 29 and an ADU reverse roller pair 30.

The automatic double-side unit 1 has a plurality of convey roller pairs 5. The sheet feed section 6 includes a plurality of sheet feed cassettes 31, 32, 33 and 34 containing a plurality of paper sheets of different sizes.

Pick-up rollers 31b, 32b, 33b and 34b for picking up sheets one by one from the uppermost ones, which are contained in the associated sheet feed cassettes 31, 32, 33 and 34, are provided near feed-side end portions (right-hand end portions in FIG. 1) of the sheet feed cassettes 31, 32, 33 and 34. Sheet feed rollers 31a, 32a, 33a and 34a are provided adjacent to the pick-up rollers 31b, 32b, 33b and 34b on the downstream side of the pick-up rollers 31b, 32b, 33b and 34b in the direction in which the sheets are taken out. A paper sheet selectively taken out of the sheet feed cassettes 31, 32, 33 and 34 by the pick-up rollers 31b, 32b, 33b and 34b and sheet feed rollers 31a, 32a, 33a and 34a is conveyed upward (in FIG. 1) via a plurality of convey roller pairs 36 provided along a sheet convey path 35. The conveyed sheet is fed to an aligning roller pair 37 provided in front of the photosensitive drum 20 of the printer section 4.

A manual feed device 39 for manually feeding a paper sheet is provided upward of the sheet feed cassette 31. The paper sheet fed via the manual feed device 39 is delivered to the aligning roller pair 37.

A front edge of the paper sheet fed to the aligning roller pair 37 from the sheet feed cassette, 31, 32, 33, 34, of the sheet feed section 6 or from the manual feed device 39 is once aligned by the aligning roller pair 37. Then, the aligning roller pair 37 is rotated in synchronism with the timing of the image forming operation in the printer section 4. Thus, the sheet is fed to a transfer region between the transfer belt 23 and photosensitive drum 20. In this manner, the above-mentioned toner image is transferred onto the sheet fed to the transfer region.

Figure 2:
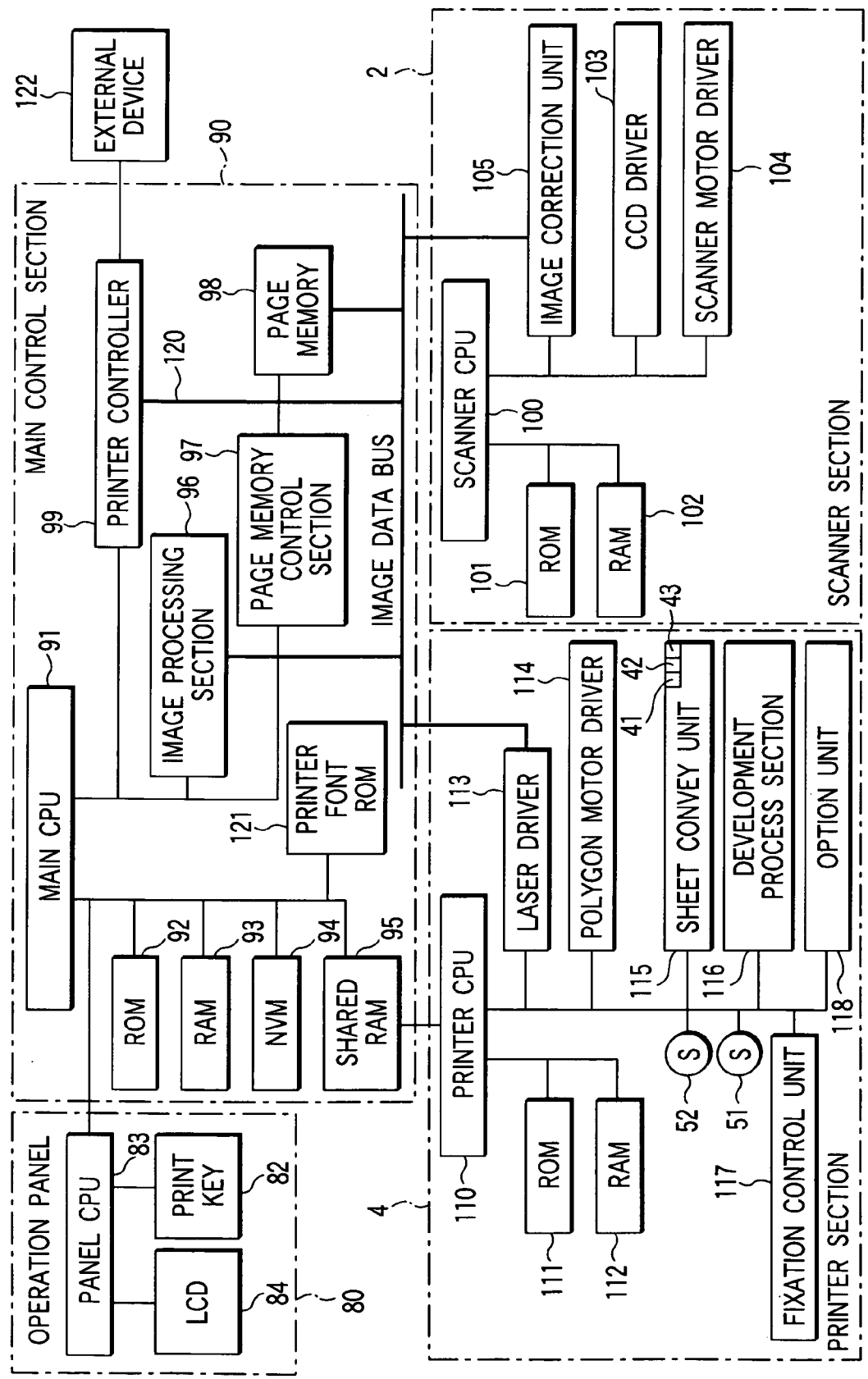
FIG. 2 is a block diagram schematically showing electrical connection of the digital copying machine and flow of signals for control.

FIG. 2 is a block diagram schematically showing electrical connection of the digital copying machine 10 shown in FIG.

1 and flow of signals for control. A control system of the digital copying machine 10 comprises three CPUs: a main CPU 91 provided in a main control section 90; a scanner CPU 100 in the scanner section 2; and a printer CPU 110 in the printer section 4. The main CPU 91 performs bi-directional communication with the printer CPU 110 via a shared RAM 95. The main CPU 91 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 80 is connected to the main CPU 91. The operation panel 80 comprises a print key 82 that instructs the start of a copying operation, a panel CPU 83 that controls the entirety of the operation panel 80, and a liquid crystal display section 84 having a touch panel for operational inputs.

As will be described later in detail, an "adjustment mode" is set through the operation panel 80 at the time of double-side printing.

The main control section 90 comprises the main CPU 91, a ROM 92, a RAM 93, an NVM 94, a shared RAM 95, an image processing section 96, a page memory control unit 97, a page memory 98, a printer controller 99, and a printer font ROM 121.

The main CPU 91 controls the entirety of the main control section 90.

The scanner section 2 comprises the scanner CPU 100 for controlling the entirety of the scanner section 2; a ROM 101 storing control programs, etc.; a data storage RAM 102; a CCD driver 103 for driving the CCD sensor 14; a scan motor driver 104 for controlling the rotation of a scanner drive motor; and an image correction unit 105.

The printer section 4 comprises the printer CPU 110 for controlling the entirety of the printer section 4; a ROM 111 storing control programs, etc.; a data storage RAM 112; a laser driver 113 for turning on/off the exposing device 21 that emits a laser beam; a polygon motor driver 114 for controlling the rotation of the polygon motor of the exposing device 21; a sheet convey unit 115 for controlling conveyance of the sheet; a development process section 116 for controlling charging, developing and transferring processes using the developing device 22 and transfer belt 23; a fixation control unit 117 for controlling the fixing device 24; and an option unit 118.

The aforementioned sensors 51 and 52 are connected to the printer CPU 110.

Figure 3:
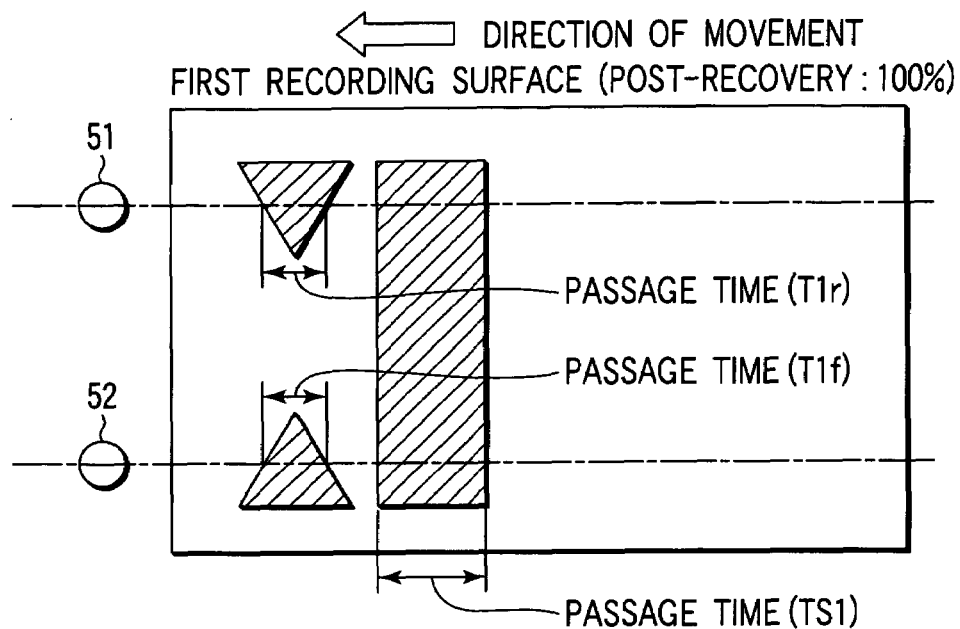
FIG. 3 illustrates a state in which a paper sheet, on which predetermined images are formed, is sensed by sensors.
Figure 4:
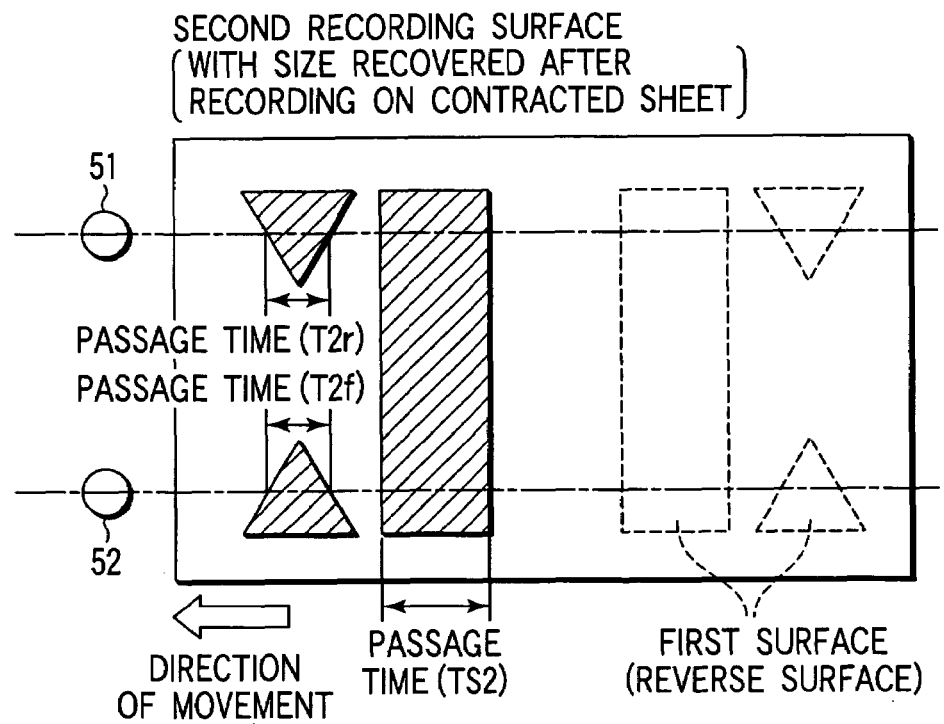
FIG. 4 illustrates a state in which a paper sheet, on which predetermined images are formed, is sensed by sensors.

FIG. 3 and FIG. 4 illustrate states in which a paper sheet, on which predetermined images are formed, is sensed by sensors 51 and 52. The predetermined images are prestored in the ROM 111.

The predetermined images comprise, for instance, a triangular solid mark that is provided at a position where the sensor 51 crosses, a triangular solid mark that is provided at a position where the sensor 52 crosses, and a rectangular solid mark that is sensed by the sensors 51 and 52.

The printer CPU 110 reads out image data of the predetermined images from the ROM 111, and prints the predetermined images on a reverse surface (first recording surface) of a paper sheet and then prints the predetermined images on an obverse surface (second recording surface) of the sheet.

FIG. 3 shows a state in which predetermined images are printed on the first recording surface of the sheet at 100% (size of sheet) and the predetermined images on the sheet that is conveyed are sensed by the sensors 51 and 52.

The sensor 51 senses a passage time (T1$r$) at which the sensor 51 crosses the triangular solid mark, and a passage time (TS1) at which the sensor 51 crosses the rectangular solid mark.

At the same time, the sensor 52 senses a passage time (T1$f$) at which the sensor 52 crosses the triangular solid mark, and a passage time (TS1) at which the sensor 52 crosses the rectangular solid mark.

FIG. 4 shows a state in which predetermined images are printed on the second recording surface of the sheet and the predetermined images on the sheet that is conveyed are sensed by the sensors 51 and 52.

The sensor 51 senses a passage time (T2$r$) at which the sensor 51 crosses the triangular solid mark, and a passage time (TS2) at which the sensor 51 crosses the rectangular solid mark.

At the same time, the sensor 52 senses a passage time (T2$f$) at which the sensor 52 crosses the triangular solid mark, and a passage time (TS2) at which the sensor 52 crosses the rectangular solid mark.

Next, a description is given of correction calculations for a main-scan magnification and a sub-scan magnification on the second recording surface according to the present invention.

After the paper sheet is subjected to thermal fixation in fixing device 24, the sheet contracts by a predetermined ratio. Within one or two minutes, the size of the sheet recovers. In the case where the sheet is subjected to thermal fixation once again in the fixing device 25 before the size of the sheet recovers, the ratio of contraction immediately after thermal fixation is equal, although recovery of size delays. Contraction of the sheet occurs both in the main-scan direction and sub-scan direction. However, the ratio of contraction differs in both directions.

In the case of double-side printing, the sheet contracts by a predetermined ratio due to the thermal fixation on the first recording surface of the sheet by the fixing device 24. With little time interval, image formation is performed on the second recording surface of the sheet. Thus, in the image formation on the second recording surface, correction is required for the main-scan magnification and sub-scan magnification.

FIG. 5 shows an example in which predetermined images are printed on the first recording surface of the sheet at 100% (size of sheet) in the main-scan direction and the predetermined images on the sheet that is conveyed are sensed by the sensors 51 and 52.

Assume that a distance between the sensor 51 and sensor 52 is 250 mm.

A distance between the apices of the triangular solid marks is 200 mm, and a distance between the bases of the triangular solid marks is 260 mm. The length of the base of each triangular solid mark is 60 mm, the gradient of each triangular solid mark is 1, and the height of each triangular solid mark is 30 mm.

Assume that the length, over which the sensor 51 senses the triangular solid mark, is L1$r$, and a distance between the position of passage and the apex of the triangular solid mark is (25+$\alpha$) mm. In addition, the length, over which the sensor 52 senses the triangular solid mark, is L1$f$, and a distance between the position of passage and the apex of the triangular solid mark is (25−$\alpha$) mm. In this case, (L1$r$)+(L1$f$)=100 mm.

If the speed V of conveyance of the sheet is 200 mm/sec, the time of passage over the triangular solid mark by the sensor 51, 52 is T1$r$, T1$f$.

Assume that (T1$r$)+(T1$f$)=0.5000 sec.

For example, immediately after the first recording surface is subjected to thermal fixation in the fixing device 24, recording is effected on the second recording surface and the second recording surface is subjected to thermal fixation in the fixing device 24. Then, the size of the sheet recovers. The condition of the sheet in this case is as follows.

The first recording surface of the sheet: 100% (sheet size); 260 mm (distance between apices); and 200 mm (between bases).

If recording is performed, immediately after thermal fixation, on the sheet that has contracted by 0.3%, the condition of the sheet is as follows.

The second recording surface of the sheet: 99.7% (sheet size); 260 mm (distance between apices); and 200 mm (between bases).

Then, if the size of the sheet recovers, the condition of the sheet is as follows.

The second recording surface of the sheet: 100% (sheet size); 260.78 mm (between apices); and 200.60 mm (between bases).

FIG. 6 shows the case where recording is effected on the second recording surface of the sheet that has contracted by 0.3%. It is supposed that there is no change in magnification in the sub-scan direction.

If recording (printing) is performed on the sheet in the state in which it has a size of "0.997", the size of the sheet recovers to "1.000".

Accordingly, 200 mm, for instance, changes to 200.6 mm. If the distance between the passage position of the sensor 51, 52 over the triangular solid mark and the apex of the triangular solid mark is 25 mm, this distance changes to 24.7 mm. If the height of the triangular solid mark is 30 mm, this height changes to 30.09 mm.

$$L2r = 60 \times (24.7 + \alpha)/30.09$$

$$L2f = 60 \times (24.7 - \alpha)/30.09$$

If the speed V of conveyance of the sheet is 200 mm/sec, $$(L2r) + (L2f) = 2 \times 60 \times 24.7/30.09 = 98.5045 \text{ mm}$$

$$(T2r) + (T2f) = 0.4925 \text{ sec.}$$

In the above-described example, 0.5000 sec is sensed as 0.4925 sec.

The variation of 0.3% in dimension corresponds to a variation of 1.5% in time (sum of sensed times of the two sensors). Therefore, the variation of 0.3% in magnification of the part of 250 mm in the main-scan direction can be measured as a variation of 1.5% in passage time.

Hence, with respect to the main-scan direction, correction data (main-scan magnification) for recording on the second recording surface can be calculated by comparing the passage time, $(T1r)+(T1f)$, over the triangular solid marks on the first recording surface, and the passage time, $(T2r)+(T2f)$, over the triangular solid marks on the second recording surface.

FIG. 7 illustrates variations in magnification in the sub-scan direction. Correction data (sub-scan magnification) for recording on the second recording surface can be calculated on the basis of the passage time TS1 over the rectangular solid mark on the first recording surface of the sheet and the passage time TS2 over the rectangular solid mark on the second recording surface of the sheet.

The amount of variation in magnification is calculated as follows.

1. A provisional main-scan magnification variation amount for recording on the second recording surface is calculated from a difference between the passage time over the triangular solid marks on the first recording surface and the passage time over the triangular solid marks on the second recording surface.

2. A sub-scan magnification variation amount (sub-scan magnification) (in the sub-scan direction alone) for recording on the second recording surface is calculated from a difference between the passage time over the rectangular solid mark on the first recording surface and the passage time over the rectangular solid mark on the second recording surface.

3. A main-scan magnification variation amount (main-scan magnification) (in the main-scan direction alone) is calculated by subtracting the sub-scan magnification variation amount from the provisional main-scan magnification variation amount.

With the above-described structure, an operation when an "adjustment mode" is set through the operation panel 80 for double-side printing will now be described with reference to flow charts of FIGS. 8 and 9. In the description below, the first recording surface of the sheet is referred to as "first surface", and the second recording surface of the sheet is referred to as "second surface".

Figure 8:
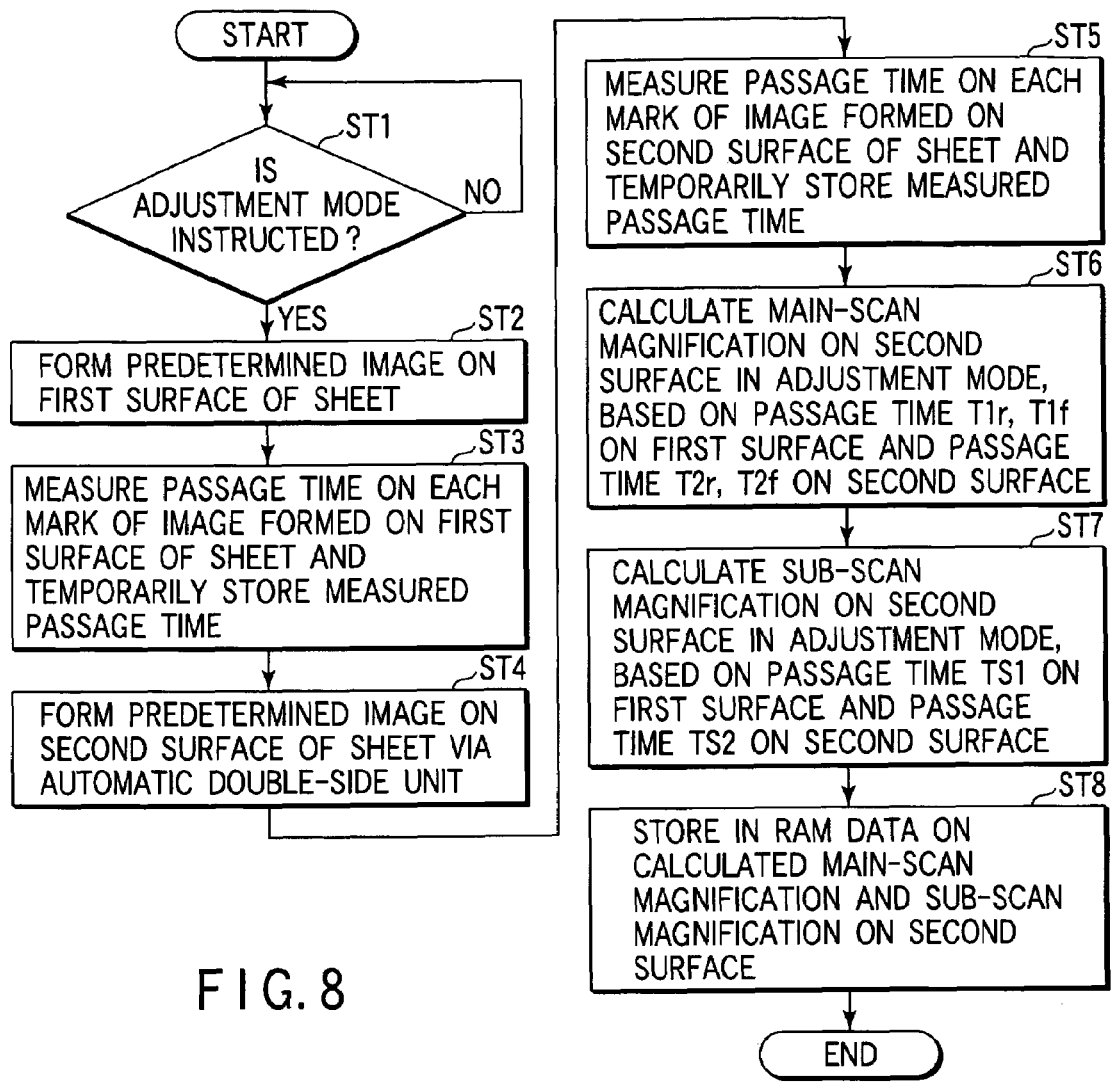
FIG. 8 is a flow chart illustrating an operation when an adjustment mode is set.

In FIG. 8, when the adjustment mode is set through the operation panel 80 and the print key 82 is depressed, the main CPU 91 first instructs the printer CPU 110 to execute an adjustment mode operation.

When the adjustment mode is instructed (ST1), the printer CPU 110 reads out predetermined image data from the ROM 111 and forms predetermined images on the first surface of the paper sheet (ST2).

When the sheet is output from the fixing device 24, the printer CPU 110 measures the passage times T1r, T1f and TS1 over the predetermined marks on the first surface of the sheet, which are sensed by the sensors 51 and 52, and temporarily stores them in the RAM 112 (ST3).

Subsequently, the printer CPU 110 forms predetermined images on the second surface of the sheet via the automatic double-side unit 1 (ST4).

When the sheet is output from the fixing device 24, the printer CPU 110 measures the passage times T2r, T2f and TS2 over the predetermined images on the second surface of the sheet, which are sensed by the sensors 51 and 52, and temporarily stores them in the RAM 112 (ST5).

The printer CPU 110 transmits to the main CPU 91 the passage times T1r, T1f and TS1 over the first surface and passage times T2r, T2f and TS2 over the second surface, which are stored in the RAM 112.

Based on the passage times T1r and T1f over the first surface and passage times T2r and T2f over the second surface which are transmitted, the main CPU 91 calculates the main-scan magnification on the second surface (correction magnification in the main-scan direction) in the adjustment mode (ST6). In this case, the ratio of extension of the second surface to the first surface is calculated. Based on the sensed time (T1r+T1f) over the first surface and the sensed time (T2r+T2f) over the second surface, an apparent extension amount (recovery amount) on the second surface is calculated.

In addition, based on the passage time TS1 over the first surface and passage time TS2 over the second surface which are transmitted, the main CPU 91 calculates the sub-scan magnification on the second surface (correction magnification in the sub-scan direction) in the adjustment mode (ST7). In this case, the ratio of extension of the second surface to the first surface is calculated. Based on the passage time TS1 over the first surface and the passage time TS2 over the second surface, an apparent extension amount (recovery amount) on the second surface is calculated.

The main CPU 91 stores the calculated correction data on the main-scan magnification and sub-scan magnification in the RAM 93 (ST8).

Figure 9:
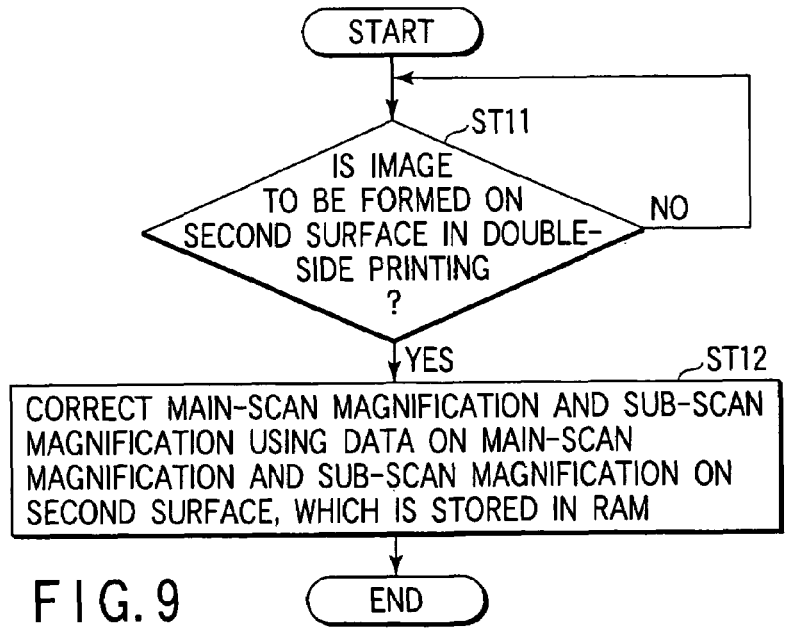
FIG. 9 is a flow chart illustrating a double-side printing operation when the adjustment mode is set.

In FIG. 9, when an image is to be formed on the second surface in the double-side printing (ST11), the main CPU 91 corrects the main-scan magnification and sub-scan magnification using the correction data on the main-scan magnification and sub-scan magnification on the second surface, which is stored in the RAM 93 (ST12).

Steps ST1 to ST8 may be executed at the time of double-side printing, or for each kind of sheet, or at the time of changing the sheet.

As has been described above, according to the embodiment of the present invention, the magnifications of recording in the main-scan direction and sub-scan direction on the first surface and second surface can properly be set at the time of double-side printing.

In the above-described embodiment, the two sensors are used. Alternatively, one sensor or more than two sensors may be used in order to achieve the object of the invention.

The embodiment of the invention is directed to a single-color digital copying machine. The invention, however, is applicable to a color digital copying machine. Where the invention is applied to a color digital copying machine, the type of the copying machine may be a 4-series tandem type, a revolver type, a transfer-belt type, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus having an automatic double-side unit and being capable of effecting printing on both surfaces of a paper sheet, comprising:
    setting section which sets an adjustment mode at a time of effecting printing on both surfaces of the paper sheet;
    first storage section which stores predetermined image data that is used in the adjustment mode set by the setting section;
    first control section which executes a control to form an image on a first surface of the sheet using the image data stored in the first storage section, when the setting section sets the adjustment mode;
    first sensor which measures a size of the image formed on the first surface of the sheet by measuring a passage time of the predetermined image formed on the first surface of the sheet, when the image formed on the first surface of the sheet is subjected to thermal fixation and conveyed;
    second control section which executes a control to form an image on a second surface of the sheet using the image data stored in the first storage section, when the sheet is reversely fed by the automatic double-side unit;
    second sensor which measures a size of the image formed on the second surface of the sheet by measuring a passage time of the predetermined image formed on the second surface of the sheet, when the image formed on the second surface of the sheet is subjected to thermal fixation and conveyed;
    calculation section which calculates correction data for a printing magnification for image formation on the second surface of the sheet, on the basis of a speed of conveyance of the paper sheet, a passage time of the predetermined image measured by the first sensor, and a passage time of the predetermined image measured by the second sensor; and
    second storage section which stores the correction data calculated by the calculation section.

2. The image forming apparatus according to claim 1, wherein the first storage section stores predetermined image data including a triangular solid mark and a rectangular solid mark.

3. The image forming apparatus according to claim 1, wherein the calculation section calculates correction data that ensures a print position and dimensional precision of the image formed on the second surface of the sheet, which thermally contracts due to thermal fixation of the image formed on the first surface of the sheet, in relation to the image formed on the first surface of the sheet, when the sheet recovers from the thermal contraction.

4. The image forming apparatus according to claim 1, wherein the calculation section calculates correction data for a magnification in a main-scan direction and a magnification in a sub-scan direction.

5. The image forming apparatus according to claim 1, wherein the second storage section stores correction data for a magnification in a main-scan direction and a magnification in a sub-scan direction.

6. An image forming apparatus having an automatic double-side unit and being capable of effecting printing on both surfaces of a paper sheet, comprising:
    setting section which sets an adjustment mode at a time of effecting printing on both surfaces of the paper sheet;
    first storage section which stores predetermined image data that is used in the adjustment mode set by the setting section;
    first image forming section which forms an image on a first surface of the sheet using the image data stored in the first storage section, when the setting section sets the adjustment mode;
    first sensor which measures a size of the image formed on the first surface of the sheet by measuring a passage time of the predetermined image formed on the first surface of the sheet, when the image formed on the first surface of the sheet is subjected to thermal fixation and conveyed;
    second image forming section which forms an image on a second surface of the sheet using the image data stored in the first storage section, when the sheet is reversely fed by the automatic double-side unit;
    second sensor which measures a size of the image formed on the second surface of the sheet by measuring a passage time of the predetermined image formed on the second surface of the sheet, when the image formed on the second surface of the sheet is subjected to thermal fixation and conveyed;
    calculation section which calculates correction data for a printing magnification for image formation on the second surface of the sheet, on the basis of a speed of conveyance of the paper sheet, a passage time of the predetermined image measured by the first sensor, and a passage time of the predetermined image measured by the second sensor;
    second storage section which stores the correction data calculated by the calculation section; and
    control section which executes, when an image is to be formed on the second surface of the sheet in double-side printing, a control to form the image by correcting a print magnification using the correction data stored in the second storage section.

7. The image forming apparatus according to claim 6, wherein the control section corrects a magnification in a main-scan direction and a magnification in a sub-scan direction using the correction data.

8. An image forming method for an image forming apparatus having an automatic double-side unit and being capable of effecting printing on both surfaces of a paper sheet, comprising:

setting an adjustment mode at a time of effecting printing on both surfaces of the paper sheet;

prestoring predetermined image data that is used in the adjustment mode;

forming an image on a first surface of the sheet using the stored image data, when the adjustment mode is set;

measuring a size of the image formed on the first surface of the sheet by measuring a passage time of the predetermined image formed on the first surface of the sheet, when the image formed on the first surface of the sheet is subjected to thermal fixation and conveyed;

forming an image on a second surface of the sheet using the stored image data, when the sheet is reversely fed by the automatic double-side unit;

measuring a size of the image formed on the second surface of the sheet by measuring a passage time of the predetermined image formed on the second surface of the sheet, when the image formed on the second surface of the sheet is subjected to thermal fixation and conveyed;

calculating correction data for a printing magnification for image formation on the second surface of the sheet, on the basis of a speed of conveyance of the paper sheet, a passage time of the predetermined image measured by the first sensor, and a passage time of the predetermined image measured by the second sensor;

storing the calculated correction data; and executing, when an image is to be formed on the second surface of the sheet in double-side printing, a control to form the image by correcting a print magnification using the stored correction data.

* * * * *